United States Patent [19]

Gentry

[11] 4,400,228

[45] Aug. 23, 1983

[54] METHOD OF MAKING LENGTHS OF FLEXIBLE INSULATED AIR DUCT WITH END COLLARS

[75] Inventor: Gary F. Gentry, Bakersfield, Calif.

[73] Assignee: Owens-Corning Fiberglas Corporation, Toledo, Ohio

[21] Appl. No.: 393,959

[22] Filed: Jun. 30, 1982

[51] Int. Cl.³ .............................................. B65H 81/00
[52] U.S. Cl. .................................. 156/144; 138/121; 138/129; 138/149; 156/184; 156/187; 156/294; 156/443; 156/446
[58] Field of Search ............... 156/143, 144, 195, 443, 156/446, 184, 185, 187, 189, 294; 138/121, 122, 129, 131, 133, 139, 149, 153, DIG. 4

[56] References Cited

U.S. PATENT DOCUMENTS

| 3,240,643 | 3/1966 | Schroeder et al. | 156/446 X |
| 3,538,956 | 11/1970 | Helbing | 138/139 X |
| 3,709,751 | 1/1973 | Carlson et al. | 156/294 X |
| 3,817,804 | 6/1974 | Helmick et al. | 156/144 |

Primary Examiner—David A. Simmons
Attorney, Agent, or Firm—Ronald C. Hudgens; Philip R. Cloutier; Paul J. Rose

[57] ABSTRACT

A tubular jacket of flexible plastic film is telescoped over one of two spaced coaxial mandrels extending toward each other, duct end collars are secured respectively on the mandrels, opposite ends of a flexible helically reinforced core are strapped respectively to the collars, a flexible insulation blanket is wrapped around the core and taped adjacent opposite ends, the jacket is pulled over the blanket, the collars are released, and the collared duct is removed from the mandrels.

2 Claims, 7 Drawing Figures

METHOD OF MAKING LENGTHS OF FLEXIBLE INSULATED AIR DUCT WITH END COLLARS

TECHNICAL FIELD

This invention relates generally to flexible insulated air duct, and more particularly to a method of making lengths of such duct with end collars.

BACKGROUND ART

Flexible insulated air duct is normally made in lengths of twenty-five feet, without end collars, on machines such as that disclosed in U.S. Pat. No. 3,950,213, using core material made by a method such as that disclosed in U.S. Pat. No. 4,299,641. The twenty-five foot lengths are cut at the point of use to other lengths, as required. There is also a demand for shorter lengths with end collars already in place, such as lengths of seven feet and lengths of three and one-half feet, for example. Before my invention, these shorter lengths were made in the factory in an assembly line fashion by cutting up the twenty-five foot lengths and securing end collars on the shorter, cut lengths. The process was labor-intensive and therefore expensive.

DISCLOSURE OF THE INVENTION

In accordance with my invention, a method of and apparatus for making the shorter, collared lengths of flexible insulated air duct are provided in which the core, insulating glass wool, and the jacket are cut to length before assembly and then assembled to the end collars. Output per worker is about five to six times greater than output under the prior process.

BRIEF DESCRIPTION OF DRAWINGS

The invention is hereinafter more fully described with reference to the accompanying drawings in which.

BEST MODE OF CARRYING OUT THE INVENTION

Figure 1:
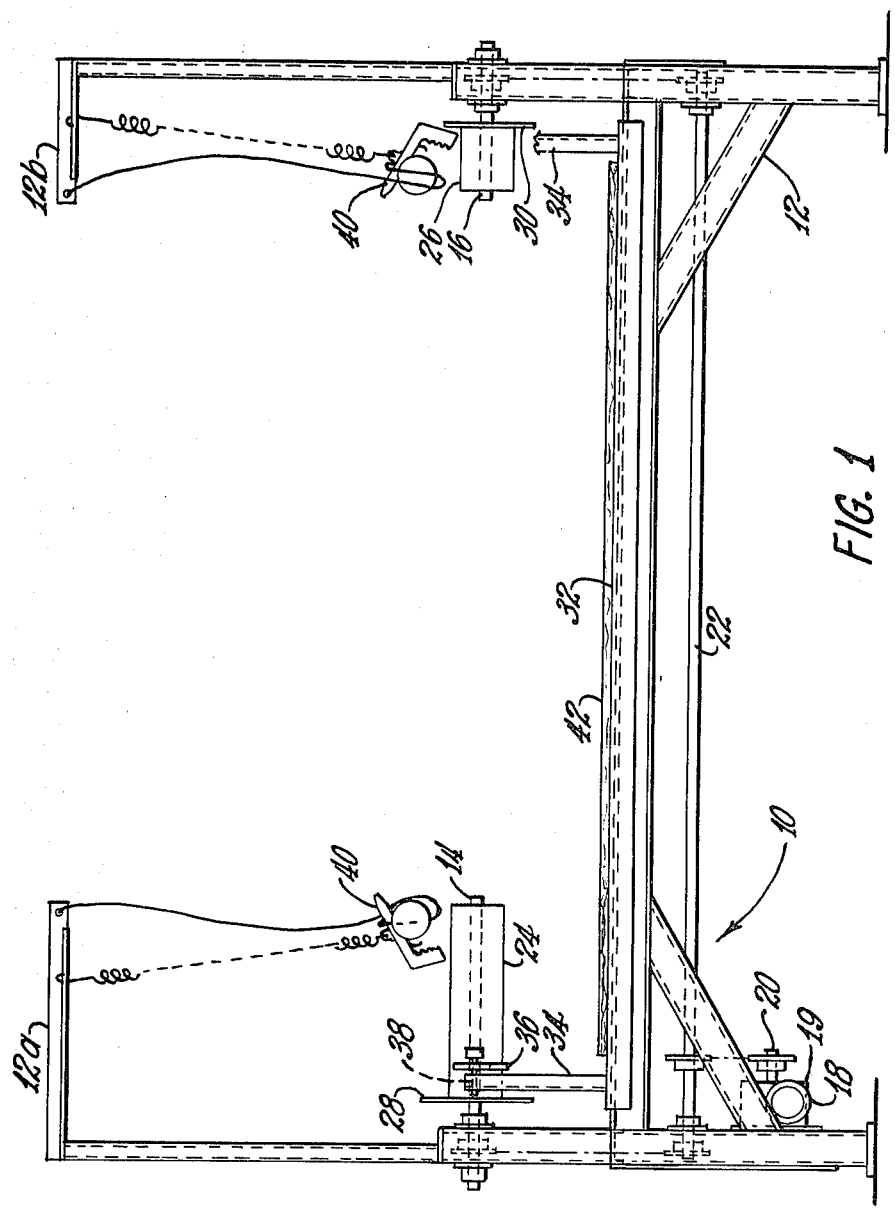
FIG. 1 is a schematic elevational view of apparatus constructed in accordance with the invention.
Figure 2:
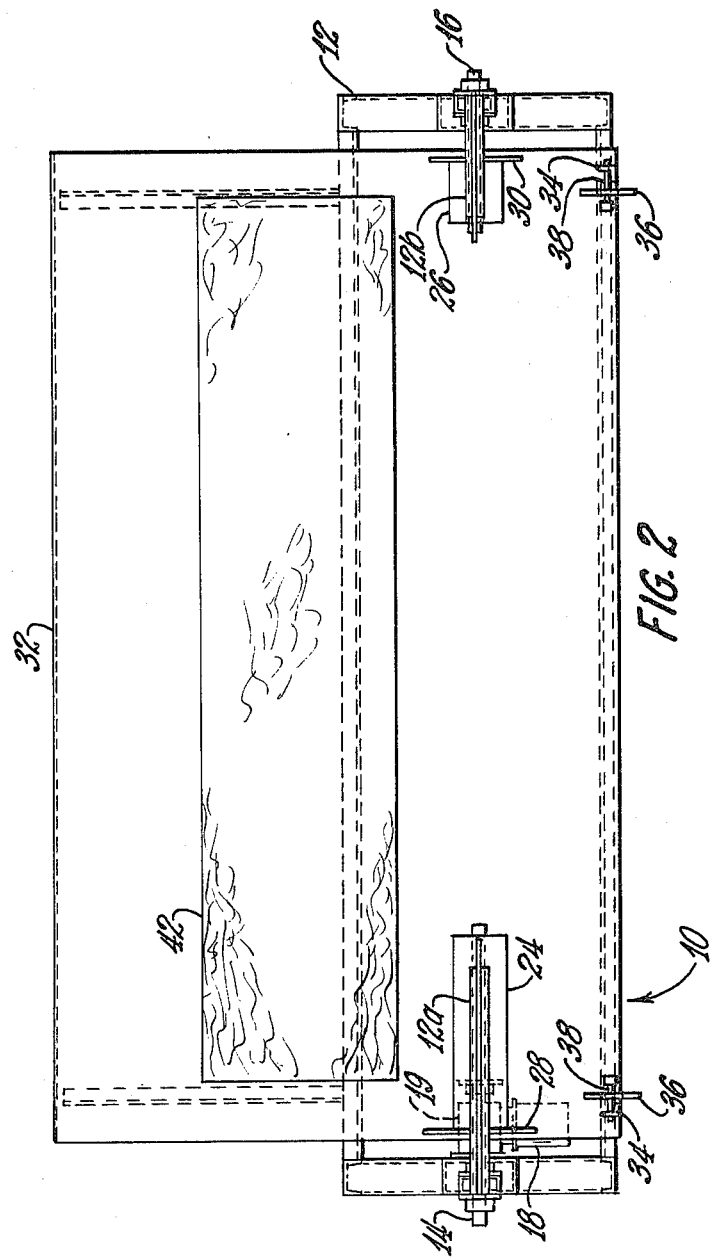
FIG. 2 is a plan view of the apparatus of FIG. 1.
Figure 3:
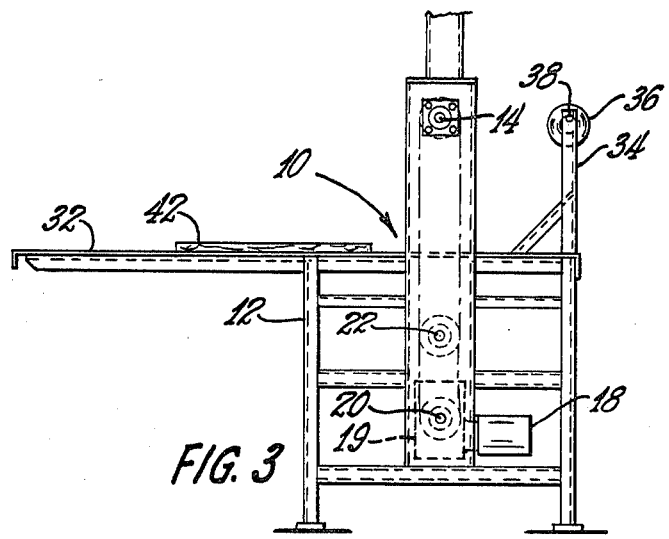
FIG. 3 is an end view of the apparatus of FIG. 1 taken from the left-hand side thereof.
Figure 4:
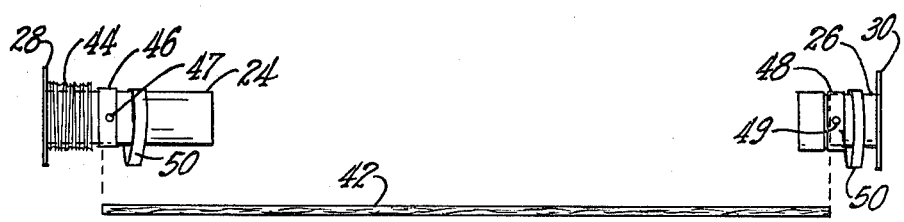
FIGS. 4, 5, 6 and 7 are schematic fragmentary views of the apparatus of FIG. 1, illustrating the method of the invention.
Figure 5:
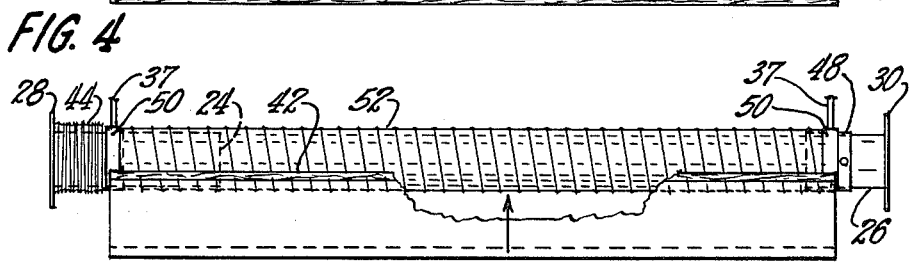
Figure 6:
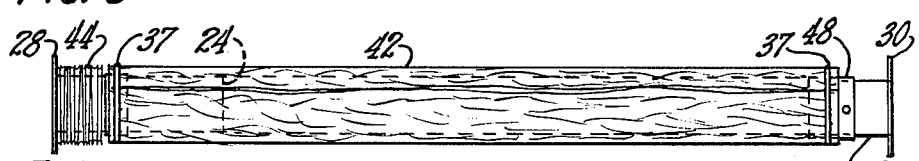
Figure 7:
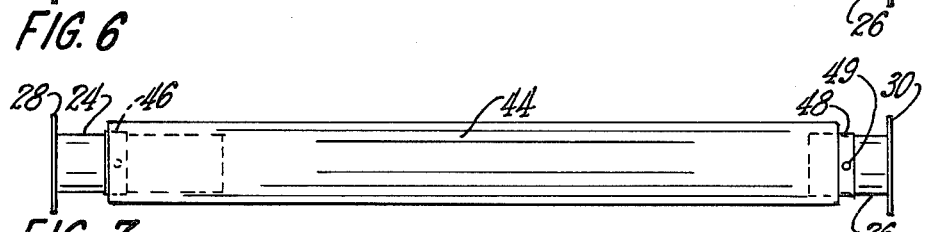

With reference to the drawings, FIGS. 1, 2, and 3 show an apparatus 10, constructed in accordance with the invention, for making the seven-foot lengths of collared duct. The apparatus 10 includes an elongated frame 12 having opposite upstanding end portions respectively on which a pair of coaxial mandrel shafts 14 and 16 are suitably rotatably mounted in cantilever fashion so as to extend toward each other from their mounted end portions. Also mounted on the frame 12 adjacent one end is a pneumatic motor 18 associated with a gear reducer 19 having an output shaft 20. An intermediate shaft 22 is mounted on the frame 12 and extends substantially the full length thereof. The output shaft 20 is operatively connected to the shaft 22 and the shaft 22 is operatively connected to both of the mandrel shafts 14 and 16 by suitable sprockets and chains.

The mandrel shaft 14 is longer than the mandrel shaft 16 and has a relatively long mandrel 24 fixedly mounted thereon for rotation therewith. A relatively short mandrel 26 is fixedly mounted on the mandrel shaft 16. Stop disks 28 and 30 are located respectively adjacent the mounted ends of the mandrels 24 and 26. A front portion of a horizontal tabletop-like platform 32 is mounted on the frame 12, a rear portion of the platform 32 overhanging the frame 12 as shown in FIGS. 2 and 3.

Mounted on the front of the platform 32 respectively adjacent opposite ends thereof are two tape roll standards 34 each rotatably supporting a roll of tape 36 on a shaft 38. Suspended respectively from a pair of overhead arm portions 12a and 12b of the frame 12 are two automatic strapping tools 40. In a preferred embodiment, the arm portions 12a and 12b are joined together as one piece extending the length of the frame 12. Another feature of a preferred embodiment includes additional framework for supporting the motor 18 and gear reducer 19 centrally of the length of the frame 12. An insulation blanket 42, preferably made of fibrous glass wool, is shown on the platform 32.

The process is best illustrated in the schematic views of FIGS. 4-7. As a first step, an operator pulls a plastic film tube 44 from a supply roll (not shown), tears it off at a scored dividing line, wraps one end over a pulling ring (not shown), places it with the pulling ring over the mandrel 24, and gathers the tube 44 up against the stop disk 28. Then he mounts a short female collar 46 on the mandrel 24 and secures it in position with a locking pin or screw 47. Similarly, at the same time another operator mounts a longer male collar 48 on the mandrel 26 and secures it in position with a locking pin or screw 49. Two pre-looped nylon, aluminum, or steel straps 50 are then slid respectively over the mandrels 24 and 26 and loosely mounted respectively on the collars 46 and 48. A precut lenght of duct liner or core 52 is then mounted at opposite ends respectively on the collars 46 and 48, and the straps 50 are respectively slid over the opposite end portions of the core 52 and tightened and clamped by the strapping tools 40 to secure the collars 46 and 48 to the core. The core is preferably like that disclosed in U.S. Pat. No. 4,299,641.

The next step is the wrapping of the insulation blanket 42 around the core 52. The blanket 42 can be pulled from a supply roll and cut to proper length by auxiliary equipment (not shown), and placed on the platform 32. Each of the two operators then pulls tape 37 from the respective roll 36 and adheres the end to the respective collar 46 or 48 over the respective strap 50, wrapping it about one-fourth to one-half of the way therearound and then placing a leading edge of the blanket 42 on the respective collar inside the tape 37 at its point of tangency with the collar. The motor 18 is then energized to rotate the mandrels 24 and 26 for about two revolutions, wind the blanket 42 once around the collars 46 and 48 and the core 52, and wind the tape 37 more than once around the blanket 42 at opposite ends thereof to hold it in position. The tapes 37 are then severed from the rolls 36 and the plastic film tube 44 is pulled over the insulation blanket 42 by the use of the pulling ring (not shown) to complete the product. An operator merely grasps diametrically opposite portions of the pulling ring (not shown) with the end of the plastic film tube 44 wrapped thereover and moves it along the blanket 42 toward the collar 48. The ring (not shown) slightly compresses the blanket 42 temporarily as it is moved therealong and makes it easier to pull the plastic film tube 44 thereover without tearing of the tube. The screws 47 and 49 are then removed respectively from the collars 46 and 48 and the collars are pulled respectively from the mandrels 24 and 26 to remove the finished seven-foot collared duct section from the apparatus 10, and the pulling ring (not shown) is then removed from the duct section by pulling it over the collar 48.

Apparatus for making the three and one-half foot sections of collared duct is similar to the apparatus 10, differing mainly in a shorter frame 12 and being operable by a single operator.

Various modifications may be made in the structure shown and described without departing from the spirit and scope of the invention.

I claim:

1. A method of making lengths of flexible insulated air duct bendable around corners without collapsing and having end collars, the method comprising telescoping a tubular jacket of flexible plastic film over a free end portion of a cantilevered first mandrel adjacent one end of a machine and gathering the jacket adjacent a mounted end portion of the first mandrel, telescoping a first duct end collar over the free end portion of the first mandrel and securing it in position, telescoping a second duct end collar over a free end portion of a cantilevered second mandrel adjacent another end of the machine and coaxial with the first mandrel and securing the second duct end collar in position, telescoping opposite end portions of a flexible helically reinforced core respectively over and strapping them respectively to the duct end collars, wrapping a flexible insulation blanket around the core and taping opposite end portions of the blanket in place, pulling an end of the tubular jacket on the first mandrel over the insulation blanket all along the length thereof to extend the gathered jacket full length and encase the insulation blanket therein, releasing the duct end collars respectively from the mandrels, and removing the collared duct from the machine.

2. A method as claimed in claim 1 wherein a leading edge of the insulation blanket is taped to the core respectively adjacent opposite ends and the mandrels are then rotated about two revolutions to wind the blanket around the core and wind tape around the blanket respectively adjacent the opposite ends.

* * * * *